Patented Aug. 29, 1950

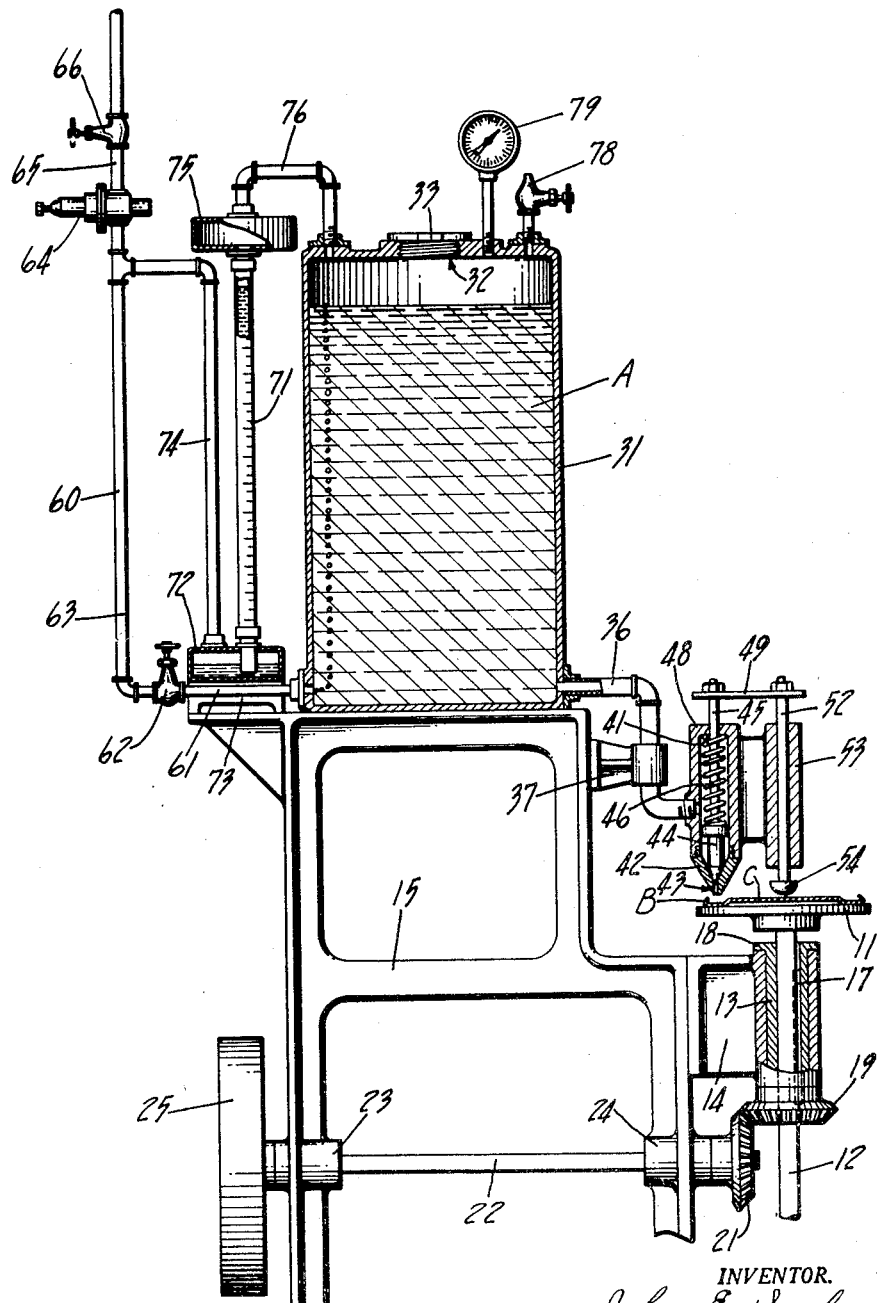

2,520,175

UNITED STATES PATENT OFFICE 2,520,175

LIQUID DISPENSING MACHINE WITH MEANS FOR CONTROLLING THE PRESSURE AT POINT OF DISCHARGE

John E. Socke, Pelham Manor, N. Y., assignor to American Can Company, New York, N. Y., a corporation of New Jersey Application December 14, 1944, Serial No. 568,184

7 Claims. (Cl. 222—396)

The present invention relates to a liquid dispensing machine or the like and has particular reference to devices for varying the pressure applied to the liquid in accordance with variation of a hydrostatic head of the liquid to maintain a constant pressure of the liquid at the place of discharge.

In liquid dispensing machines certain kinds of thin liquids will readily flow by gravity while other liquids of a more viscous nature must be forced to flow by the use of pressure to obtain the best results. In either case, the pressure on the liquid at the place of discharge varies in accordance with the hydrostatic head pressure of the supply of liquid. Where such machines are used to apply coating materials or compositions to the surfaces of articles the variable pressure of the liquid at the place of discharge often results in non-uniform thickness of the coating and other irregularities which cannot be tolerated under high speed production.

The instant invention contemplates overcoming this difficulty by controlling the pressure of the liquid at the place of discharge.

An object of the invention is the provision in a liquid dispensing machine of pressure control devices wherein a pressure is maintained on the surface of a liquid to be dispensed and is varied in accordance with the hydrostatic head pressure of the liquid so that a constant liquid pressure at the place of discharge will be maintained.

Another object is the provision of such devices wherein air is used as a pressure medium and is passed through the liquid against the resistance of its hydrostatic head to build up above the liquid an increasing pressure as the supply of liquid diminishes to maintain a constant pressure for the liquid at the place of discharge.

Another object is the provision in a machine of this character of fluid medium gauge devices for visually indicating the level of the supply of liquid, the level in the gauge devices being controlled by and changing with the varying air pressure exerted on the liquid.

Another object is the provision in such a machine of valve venting devices wherein the desired balancing pressure on the supply of liquid may be initially built up in a rapid manner.

Numerous other objects and advantages of the invention will be apparent as it is better understood from the following description, which, taken in connection with the accompanying drawings, discloses a preferred embodiment thereof.

Referring to the drawings:

The single figure illustrates a vertical sectional view of one form of liquid dispensing machine embodying the instant invention.

As a preferred embodiment of the invention the drawings illustrate principal parts of a can end lining machine in which a liquid rubber composition lining material A is deposited in a curl B of a sheet metal can end C to provide a uniform thickness gasket for the can end.

The can end C to be lined is supported in a horizontal position on a rotatable and vertically movable plate or support 11 so that the can end may be raised into position to receive in its curl B a charge of the lining material A and at the same time be rotated so that the lining material will be spread all the way around the end to form the gasket as a continuous annulus. The plate 11 is secured to the upper end of a lift rod 12 which may be raised and lowered in any suitable manner in time with the other moving parts of the machine.

The lift rod 12 is slidably mounted in a rotatable sleeve 13 journaled in a bearing bracket 14 bolted to a frame 15 which constitutes the main frame of the machine. A feather 17 in the rod operates in a keyway formed in the sleeve and thus effects rotation of the rod and its plate 11 with the sleeve. The sleeve is confined in its bearing bracket against displacement therefrom by a flange 18 which is formed on the upper end of the sleeve and by a bevel gear 19 which is mounted on its lower end.

Rotation of the plate 11 is effected by the bevel gear 19 and by a meshing bevel gear 21 which latter gear is mounted on a horizontal drive shaft 22. The drive shaft is journaled in a pair of spaced bearings 23, 24 which are formed in the machine frame 15. A belt pulley 25 mounted on the drive shaft provides for rotation of the shaft.

A supply of the liquid lining material A for deposit in the can end C is contained in a closed tank or reservoir 31 which is supported on the machine frame 15. An opening 32 is provided in the top of the tank for replenishing the tank with lining material when the latter runs low or becomes exhausted. The opening is normally closed with a threaded cap 33 so that the tank will be air-tight when in use.

Dispensing of the lining material A from the tank 31 is effected by way of a pipe 36 which is threadedly secured in the side of the tank near its bottom end. The pipe extends down below the tank and is held in place by a bracket 37 which is bolted to the frame 15. The lower end of the pipe is threadedly secured in a valve housing 41 having a liquid dispensing nozzle or outlet element 42 which is disposed above and in vertical alignment with the curl B of a can end C located on its support 11.

The nozzle 42 is formed with a dispensing opening 43 which is normally closed by a conventional tapered valve 44 disposed within the housing. The valve has a stem 45 which is surrounded by a coiled compression spring 46 which bears against the valve and yieldingly keeps it closed. The valve stem extends up through a bearing 48 in the top of the housing.

Beyond the valve housing 41 the valve stem 45 is secured to one end of a horizontal cross bar 49. The other end of the bar is connected to a valve actuating rod 52 disposed in a vertical slide bearing 53 formed on the valve housing. The rod is located above and in vertical alignment with the center of a can end C on its support 11. The lower end of the rod has a rounded actuating head 54. This is a conventional dispensing valve construction.

When a can end C is raised into position by actuation of the support lift rod 12 the can end engages against the actuating head 54 of the rod 52 and thus pushes the rod upwardly. This movement of the rod, through the cross bar 49 lifts the valve stem 45 and the valve 44 against the resistance of the spring 46 and thus opens the nozzle 42 to permit lining material A from the tank 31 to flow out into the curl B of the can end C as it rotates with its support 11. Lowering of the support 11 permits the valve actuating rod 52 to drop and this closes the valve through the action of the spring 46 and thus cuts off the flow of lining material to the can end curl.

In order to maintain a constant pressure of the liquid lining material A as it discharges from the nozzle 42 so that a uniform thickness film of the material will be deposited on the rotating can end C, a variable pressure is created within the tank 31 on the surface of the lining material throughout the operation of the machine and such pressure is in inverse ratio to the hydrostatic head pressure of the liquid within the tank. In the instant machine this is brought about by introducing air under pressure into the lining material in the tank and forcing it up through the material into the head space thereabove so as to build up a pressure above the material, which pressure at all times augments the hydrostatic head pressure of the material which necessarily diminishes as the level of the latter recedes with withdrawal of the material from the tank through the nozzle.

The air under a constant pressure is introduced into the lining material A in the tank by way of a pipe line generally indicated by the numeral 60. This pipe line includes a horizontal pipe 61 having one end threadedly secured in an open boss formed in the side of the tank 31 near its bottom end. For best results the inlet end of the pipe should be as near the bottom of the tank as possible. The opposite end of the pipe is secured into one side of a manually operable shut-off valve 62. The other side of the valve is connected to a pipe 63 which leads to a pressure regulator 64. The pressure regulator is connected also to an inlet pipe 65 which leads from any suitable source of air under pressure. This inlet pipe includes a manually operable normally open cut-off service valve 66 which controls the source of air to the machine.

Hence when the two shut-off valves 62, 66 are open, air under a constant pressure, controlled by the pressure regulator 64, flows into the tank 31 and bubbles up through the lining material A therein against the resistance of this material and enters into the head space above the material. The pressure of the incoming air necessarily is greater than the hydrostatic head pressure of the material when the tank is full, otherwise at the beginning of operations of the machine, there would be no bubbling up of the air through the material. Thus air accumulates above the liquid and builds up a pressure sufficient to discharge the material from the nozzle when the latter is open, as desired.

The pressure of the material at the nozzle equals the hydrostatic head pressure plus the air pressure on the surface of the liquid. Hence the flow of air from the pipe line 60 into the tank will continue as long as the liquid is being used, this pressure above the material plus the hydrostatic head pressure tending at all times to equal the pressure of the incoming air in the pipe line. When pressures within the tank and within the pipe line are balanced, the flow of air into the tank ceases.

In other words, as the level of the lining material in the tank falls, with the withdrawal of the material by way of the nozzle during the deposit of the material onto can ends C, the hydrostatic head decreases and accordingly unbalances the pressure in the tank relative to that in the pipe line. This insures the entrance of more air into the tank and this air bubbles up into the head space thus building up the air pressure therein and restoring the balance of pressures. In this manner there is maintained a constant pressure on the liquid at the nozzle.

Provision is made for visually indicating the quantity of lining material A in the tank 31 at all times so that it may be replenished when it begins to run low. For this purpose there is provided a graduated, transparent, gauge tube 71, preferably made of glass, and disposed adjacent the tank although it is not necessary that this gauge be anywhere near the tank nor at the same level if otherwise desired. The gauge tube is mounted on a closed, air-tight, gauge receptacle 72 which is suported on a bracket 73 formed on the machine frame 15. The receptacle contains a fluid gauging medium, such as water.

The lower end of the gauge tube 71 extends down into the fluid medium and terminates adjacent the bottom of the receptacle 72 in closely spaced relation thereto sufficient to permit the gauging medium to be forced up into the tube. This forcing of the medium up into the tube is effected by air under constant pressure which is admitted into the gauge receptacle by way of a branch pipe 74. One end of the pipe is secured in the top of the receptacle while the other end is connected into the main pipe line 60 between the pressure regulator 64 and the shut-off valve 62.

The upper end of the gauge tube 71 is secured into the bottom of a closed, air-tight, surge basin 75. This surge basin is connected by a pipe 76 to the head space of the tank 31. One end of the pipe is secured into the top of the basin while the opposite end is connected into the top of the tank.

Thus the fluid medium in the gauge tube 71 is under pressure at both ends of the tube. At the lower end of the tube, the air under constant pressure from the main air line 60 through branch pipe 74 forces the medium up in the tube while at the upper end, the air under varying pressure above the liquid in the tank 31 forces the medium down in the tube. Hence the net result is a column of gauging medium in the tube having a hydrostatic head pressure which when augmented by the pressure of the air in the head space of tank 31, will balance the constant pressure of the air in the pipe line 60, 74.

Hence as the pressure in the head space above the material in the tank 31 builds up, it exerts this increased pressure on the column of fluid in the gauge tube and thus controls the level of this fluid in accordance with the quantity of material in the tank. Thus the change in the upper level of this column of fluid medium indicates a corresponding change in the level of the liquid in the tank. The graduations on the tube visually show the quantity of liquid in the tank even though the gauge be located at a distance from the tank or at a different level than the tank or tank liquid level.

Provision is also made for relieving the pressure in the tank 31 when it is desired to replenish the tank with additional liquid lining material. For this purpose there is provided a manually operable, normally closed relief valve 78 which is threaded into the top of the tank. Before opening this valve to relieve the pressure, the two shut-off valves 62, 66 in the pipe line 60 are closed. Then the filling cap 33 may be removed for filling the tank.

After the tank is filled, the cap 33 is screwed into place and the relief valve 78 is closed. If desired, reestablishment of the air pressure above the lining material in the tank may be greatly expedited by admitting the air through the gauge devices instead of waiting until the pressure is built up by the air passing up through the liquid in the tank. This rapid reestablishment of the pressure is brought about by opening the shut-off valve 66 alone and keeping the valve 62 closed. Air from the pipe line 60 and branch pipe 74, then forces the fluid medium in the gauge receptacle 72 up through the gauge tube 71 and into the surge basin 75. The medium in this basin is spread out sufficiently to permit the air to bubble up through it rapidly and travel over into the head space of the tank 31 by way of the pipe 76.

When sufficient air has been received in the head space of the tank 31 in this manner to bring the pressure up to a desired degree to start the machine the shut-off valve 62 is opened to permit air from the pipe line 60 to enter the tank through the liquid. This again brings about a balanced pressure condition in the tank and permits the fluid gauge medium to drain out of the surge basin and return to the gauge tube and its receptacle. If too much air has been admitted to the head space of the tank while reestablishing the pressure therein, some of it may be released by opening the relief valve 78 slightly. A pressure gauge 79 secured in the top of the tank is used to gauge the amount of air initially admitted into the head space of the tank during the reestablishment of the pressure therein.

If the air supply from the main pipe line 60 should fail or if through negligence the valve 62 is left open when the machine is shut down, as for example over night, the air under pressure in the space above the liquid in the tank 31 is dissipated and this prevents the liquid from being forced up into the pressure regulator 64 and the gauge device. This dissipation of the air occurs through the gauge tube 71.

As soon as the air in the main pipe line 60 fails or is cut off, the pressure on the fluid medium in the gauge tube becomes unbalanced and the air in the tank 31 then forces the medium down into the fluid receptacle 72. Since the resistance is less through the fluid medium than it is through the liquid in the tank, the air bubbles up through the medium in the fluid receptacle and escapes through the pipe 74 into the main pipe line 60.

With the pressure thus immediately relieved on the liquid in the tank 31 and with insufficient air in the main pipe line to react against it, this liquid will seek its own level in the main pipe line. Hence the liquid from the tank is prevented from being forced up into the regulator or into the gauge device. It should be noted that the pressure regulator 64 and the adjacent short pipe 74 leading to the gauge device, are located above the highest probable level of the liquid in the tank 31 so that liquid cannot flow into them when seeking its own level.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a liquid dispensing machine, a closed tank for containing the liquid, a nozzle connected with said tank for dispensing the liquid therefrom, an air line connected to said tank for introducing air under a constant pressure into said liquid to build up a balancing pressure above said liquid as the level of the liquid and its hydrostatic head pressure diminishes in accordance with the discharge of the liquid from said nozzle to maintain a constant pressure of the liquid at the nozzle, a gauge receptacle disposed adjacent said tank for containing a fluid gauge medium, a gauge tube mounted vertically on said gauge receptacle and having its lower end extending into the fluid medium in said receptacle, a pipe connection between said receptacle and said air line for transmitting air under constant pressure from said air line to said receptacle to force the medium up into said gauge tube, and a pipe connection between the upper end of said gauge tube and the upper end of said tank for setting up a counter-pressure in said tube equal to the balancing pressure in said tank for indicating in the tube change of the level of the liquid in the tank.

2. In a liquid dispensing machine, a closed tank for containing the liquid, a nozzle connected with said tank for dispensing the liquid therefrom, an air line connected to said tank for introducing air under a constant pressure into said liquid to build up a balancing pressure above said liquid as the level of the liquid and its hydrostatic head pressure diminishes in accordance with the discharge of the liquid from said nozzle to maintain a constant pressure on the liquid at the nozzle, a gauge receptacle disposed adjacent said tank and containing a fluid gauge medium, a sight gauge tube mounted on said gauge receptacle and having its lower end extending into the fluid medium in said receptacle, a pipe connection between said receptacle and said air line for transmitting air under constant pressure from said air line to said receptacle to force the medium up into said gauge tube, a pipe connection between the upper end of said gauge tube and the upper end of said tank for setting up a counter-pressure in said tube equal to the balancing pressure in said tank for indicating in the tube a corresponding level of the liquid in the tank, a valve in said air line for temporarily cutting off the flow of air into the liquid in said tank to allow air from said air line to flow through said pipe connection and thence through said gauge tube into the tank above the liquid level therein to rapidly and initially build up the balancing pressure on the liquid, and a surge receptacle on said gauge tube for temporarily receiving the fluid gauge medium from the gauge tube during the passage of air through said tube.

3. In a liquid dispensing machine, a closed tank for containing the liquid, a nozzle connected with said tank for dispensing the liquid therefrom, an air line connected to said tank for introducing air under a constant pressure into said liquid to build up a balancing pressure above said liquid as the level of the liquid and its hydrostatic head pressure diminishes in accordance with the discharge of the liquid from said nozzle to maintain a constant pressure of the liquid at the nozzle, a gauge receptacle disposed adjacent said tank for containing a fluid gauge medium, a sight gauge tube mounted vertically on said gauge receptacle and having its lower end extending into the fluid medium in said receptacle, a pipe connection between said receptacle and said air line and having the inlet from said air line disposed above the highest level of the liquid in said tank for transmitting air under constant pressure from said air line to said receptacle to force the medium up into said gauge tube, and a pipe connection between the upper end of said gauge tube and the upper end of said tank for setting up a counter-pressure in said tube equal to the balancing pressure in said tank for indicating in the tube change of level of the liquid in the tank, whereby air under pressure in said tank returns through said gauge tube and escapes into said air line to prevent the liquid in said tank from being forced into the gauge tube connecting with said air line when the supply of air in said line fails.

4. In a machine for lining can ends, the combination of a closed tank for containing a lining liquid, said tank having a head space disposed above the surface level of the liquid therein, an outlet element connected with said tank for dispensing the liquid therefrom, an air line connected to opposite ends of said tank for introducing air pressure in opposite directions into the tank head space to collectively exert pressure against the surface level of the liquid therein, to build up a balancing pressure in the head space above said liquid as the level of the liquid and its hydrostatic head pressure diminish in accordance with the discharge of the liquid from said outlet element, whereby to maintain a constant pressure of the liquid at the outlet element, and means in said air line for controlling the introduction of air pressure to said tank head space in one direction only to rapidly reestablish pressure conditions therein after the supply of liquid in said tank has been replenished.

5. In a machine for lining can ends, the combination of a closed tank for containing a lining liquid, said tank having a head space above the surface level of the liquid therein, a nozzle connected with said tank for dispensing the liquid therefrom, an air line connected to opposite ends of said tank for introducing air pressure in opposite directions into the tank head space to collectively exert pressure against the surface level of the liquid therein, an automatic pressure regulator disposed in said air line for maintaining a predetermined constant air pressure sufficiently effective against the surface level of said contained liquid to balance the varying hydrostatic head pressures of the liquid in the tank resulting from continued dispensing of the liquid from said nozzle, whereby to maintain a constant discharge pressure of the liquid at the nozzle, and means in said air line for controlling the introduction of air pressure to said tank head space in one direction only to rapidly reestablish pressure conditions therein after the supply of liquid in said tank has been replenished.

6. In a machine for lining can ends, the combination of a closed tank for containing a lining liquid, said tank having a head space above the surface level of the liquid therein, a nozzle connected with said tank for dispensing liquid therefrom, means connected to said tank for introducing compressed air thereinto against the liquid surface level in the tank for varying the pressure on the liquid in accordance with the diminishing hydrostatic head pressure of the liquid as the latter is dispensed so as to maintain a constant pressure of the liquid at the nozzle as the liquid discharges therefrom, a liquid level indicating means communicably connected at its opposite ends to said tank head space and to said air introducing means respectively, said indicating means being responsive to varying air pressure exerted against the adjacent receding liquid surface level in the tank head space and to varying air pressure exerted against the opposite end of said indicating means, whereby to indicate variations in the level of the liquid in the tank, and valve actuated means in said air line for controlling the introduction of air pressure to said tank head space in one direction only to rapidly reestablish pressure conditions therein after the supply of liquid in said tank has been replenished.

7. In a machine for lining can ends, the combination of a closed tank for containing a lining liquid, said tank having a head space above the surface of the liquid therein, a nozzle connected to said tank for dispensing the liquid therefrom, an air line connected to said tank for introducing air under a constant predetermined pressure greater than atmospheric into said tank head space to build up a balancing pressure against said liquid as the level of the liquid and its hydrostatic head pressure diminish in accordance with the discharge of the liquid from said nozzle so as to maintain a constant pressure on the liquid at the nozzle, a liquid level indicating tube communicably connected at its opposite ends to said tank head space and to said air line respectively, said indicating tube being responsive to varying air pressure exerted against the adjacent receding liquid surface level in the tank head space and to varying air pressure exerted against the opposite end of said tube for indicating variations in the level of the liquid in the tank, a normally closed relief valve communicating with said tank head space for dissipating the air pressure in the tank when refilling the tank with liquid, and valve actuated means in said air line for controlling the introduction of air pressure to said tank head space in one direction only to rapidly reestablish pressure conditions therein after the supply of liquid in said tank has been replenished.

JOHN E. SOCKE.

REFERENCES CITED

The following references are of record in the file of this patent:

UNITED STATES PATENTS

| Number | Name | Date |
|---|---|---|
| 2,131,329 | Moore | Sept. 27, 1938 |

FOREIGN PATENTS

| Number | Country | Date |
|---|---|---|
| 115,726 | Great Britain | May 23, 1918 |
| 121,517 | Great Britain | Dec. 19, 1918 |
| 654,924 | France | Dec. 7, 1928 |